(12) United States Patent
Lee et al.

(10) Patent No.: US 11,989,898 B2
(45) Date of Patent: May 21, 2024

(54) CAMERA MODULE

(71) Applicant: LG INNOTEK CO., LTD., Seoul (KR)

(72) Inventors: Woong Lee, Seoul (KR); Seong Ha Jang, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 525 days.

(21) Appl. No.: 17/278,079

(22) PCT Filed: Sep. 20, 2019

(86) PCT No.: PCT/KR2019/012283
§ 371 (c)(1),
(2) Date: Mar. 19, 2021

(87) PCT Pub. No.: WO2020/060321
PCT Pub. Date: Mar. 26, 2020

(65) Prior Publication Data
US 2021/0383561 A1   Dec. 9, 2021

(30) Foreign Application Priority Data

Sep. 21, 2018   (KR) ........................ 10-2018-0114091

(51) Int. Cl.
*G06T 7/55*      (2017.01)
*G01S 17/894*    (2020.01)
(Continued)

(52) U.S. Cl.
CPC .............. *G06T 7/55* (2017.01); *G01S 17/894* (2020.01); *G06T 1/0007* (2013.01); *H04N 5/33* (2013.01); *H04N 23/55* (2023.01)

(58) Field of Classification Search
CPC ......... G06T 7/55; G06T 1/0007; G06T 7/521; G01S 17/894; G01S 17/36; G01S 17/86;
(Continued)

(56) References Cited

U.S. PATENT DOCUMENTS

| 2007/0002159 A1 | 1/2007 | Olsen et al. |
| 2012/0162197 A1 | 6/2012 | Park et al. |

(Continued)

FOREIGN PATENT DOCUMENTS

| KR | 10-2012-0071970 A | 7/2012 |
| KR | 10-1629610 B1 | 6/2016 |
| KR | 10-2017-0050058 A | 5/2017 |

*Primary Examiner* — Jianxun Yang
(74) *Attorney, Agent, or Firm* — Birch, Stewart, Kolasch & Birch, LLP

(57) ABSTRACT

A camera module according to an embodiment of the present invention comprises: a light output portion for successively outputting a first output light signal and a second output light signal, which are emitted to an object, during a single period; a lens portion for concentrating a first input light signal and a second input light signal, which are reflected from the object, the lens portion comprising an infrared (IR) filter and at least one lens disposed on the IR filter; an image sensor for generating a first electric signal and a second electric signal from the first input light signal and the second input light signal, which have been concentrated by the lens portion; a tilting portion for shifting optical paths of the first input light signal and the second input light signal according to a predetermined rule; and an image control portion for acquiring depth information of the object by using the first electric signal and a phase difference between the first output light signal and the first input light signal, and acquiring a 2D image of the object by using the second electric signal.

16 Claims, 14 Drawing Sheets

(51) Int. Cl.
*G06T 1/00* (2006.01)
*H04N 5/33* (2023.01)
*H04N 23/55* (2023.01)

(58) Field of Classification Search
CPC .......... G01S 17/89; H04N 5/33; H04N 23/55; H04N 5/2226; H04N 13/207; H04N 13/254; H04N 13/271
See application file for complete search history.

(56) References Cited

U.S. PATENT DOCUMENTS

| | | |
|---|---|---|
| 2014/0176693 A1 | 6/2014 | Podoleanu |
| 2014/0300701 A1* | 10/2014 | Park ................ H04N 23/682 348/46 |
| 2016/0349369 A1* | 12/2016 | Lee .................. G06T 7/586 |
| 2017/0127036 A1 | 5/2017 | You et al. |

\* cited by examiner

[FIG. 1]
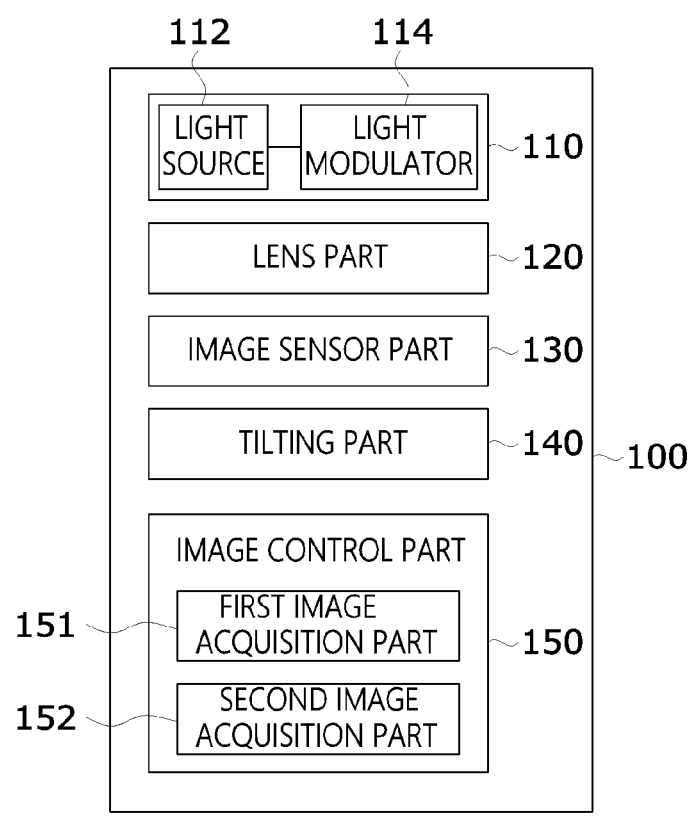

[FIG. 2]
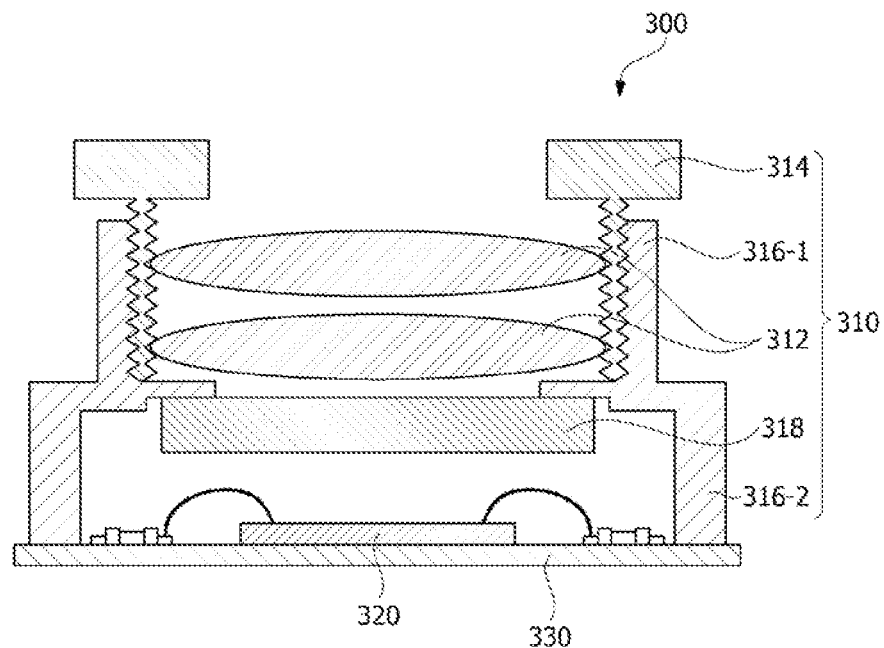

[FIG. 3]
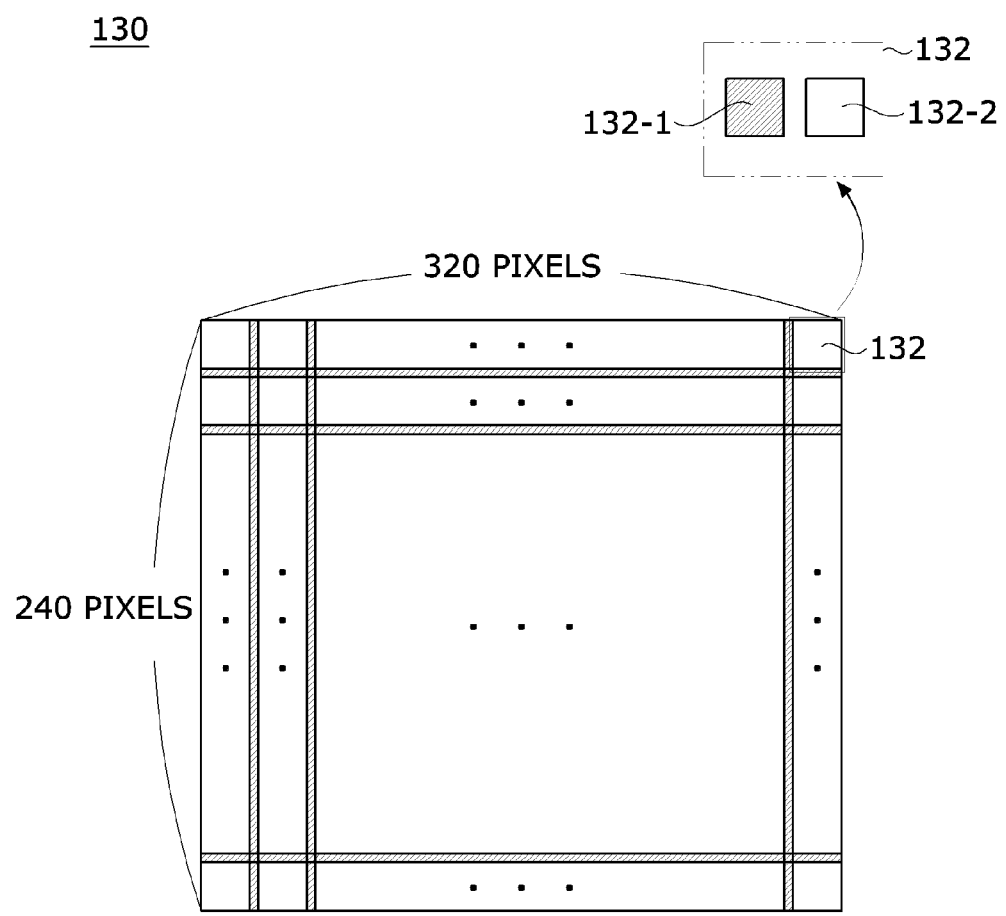

[FIG. 4]
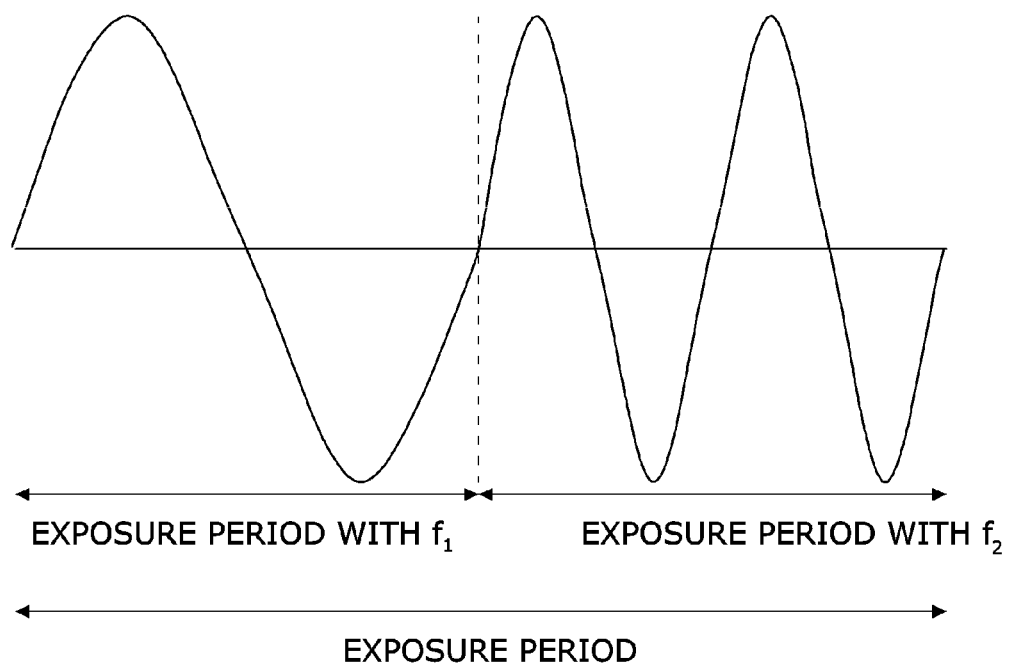

[FIG. 5]
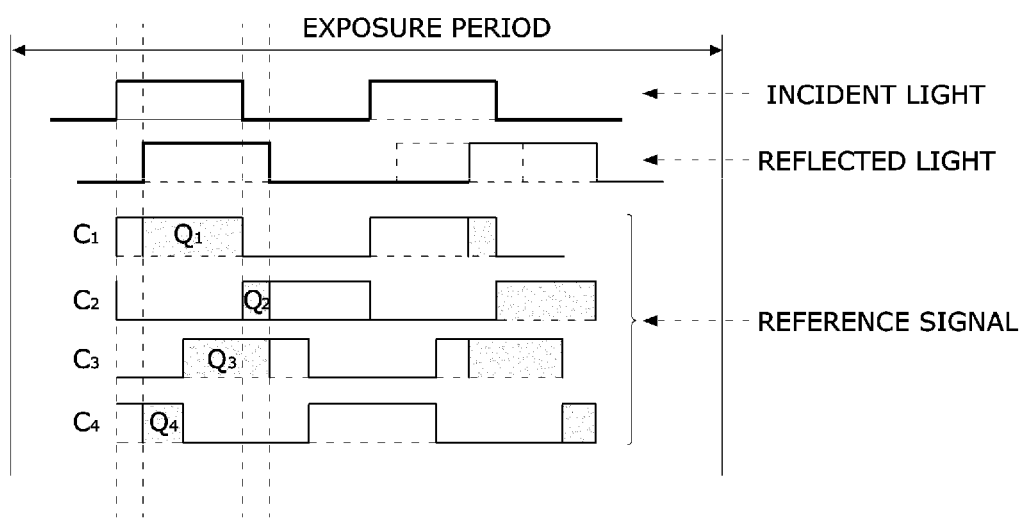

[FIG. 6]
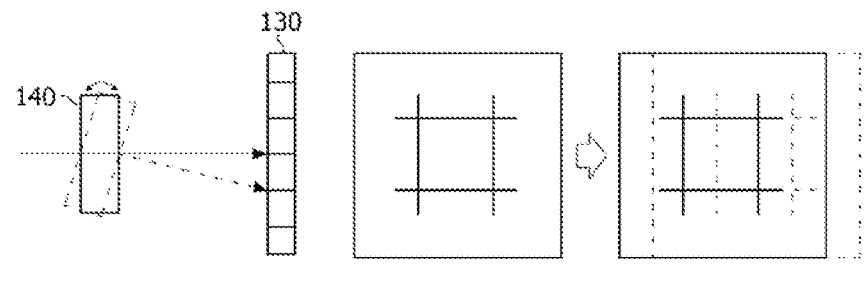
(a)
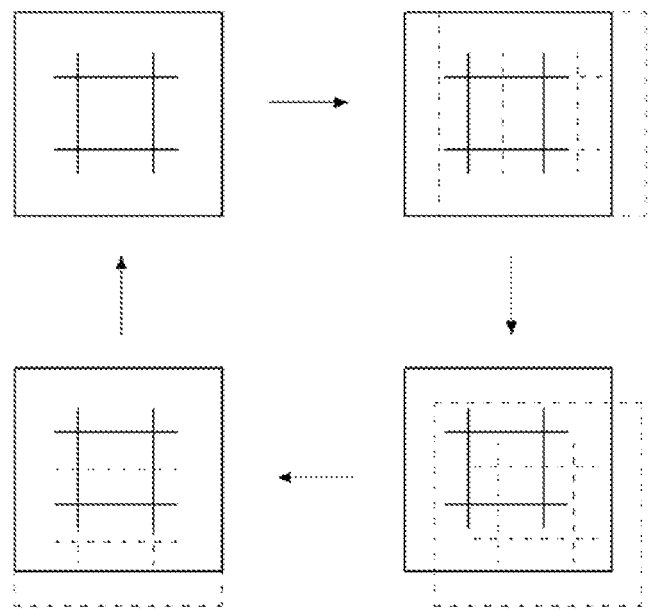
(b)

[FIG. 7]
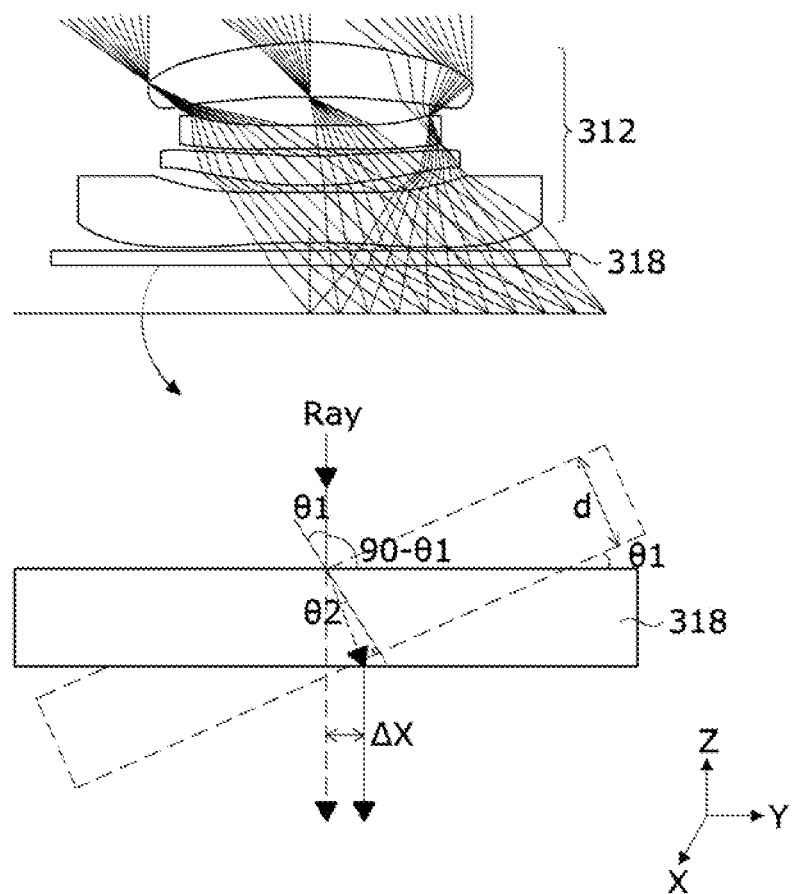

[FIG. 8]
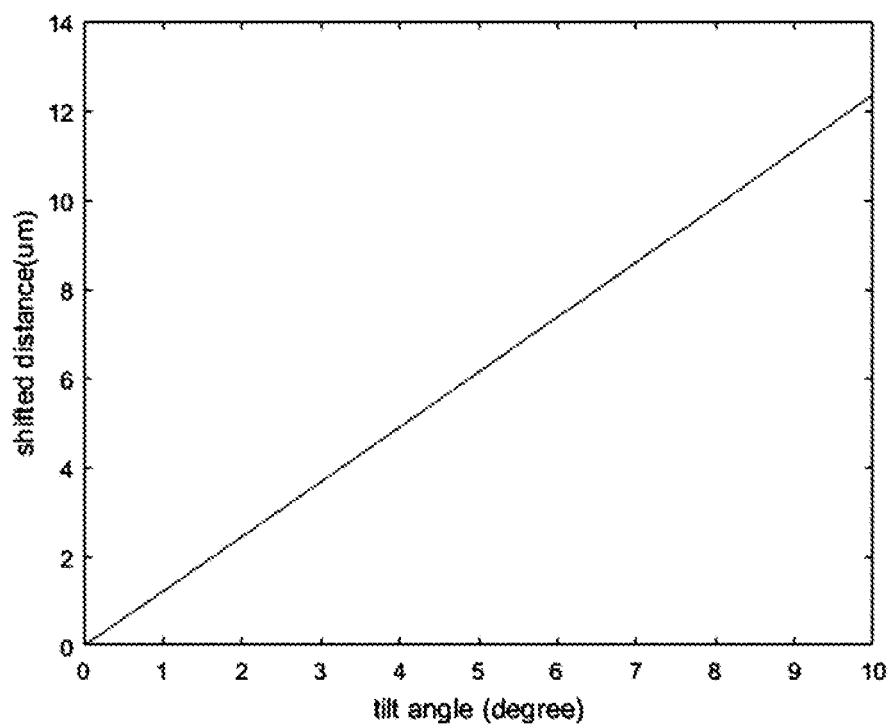

[FIG. 9]
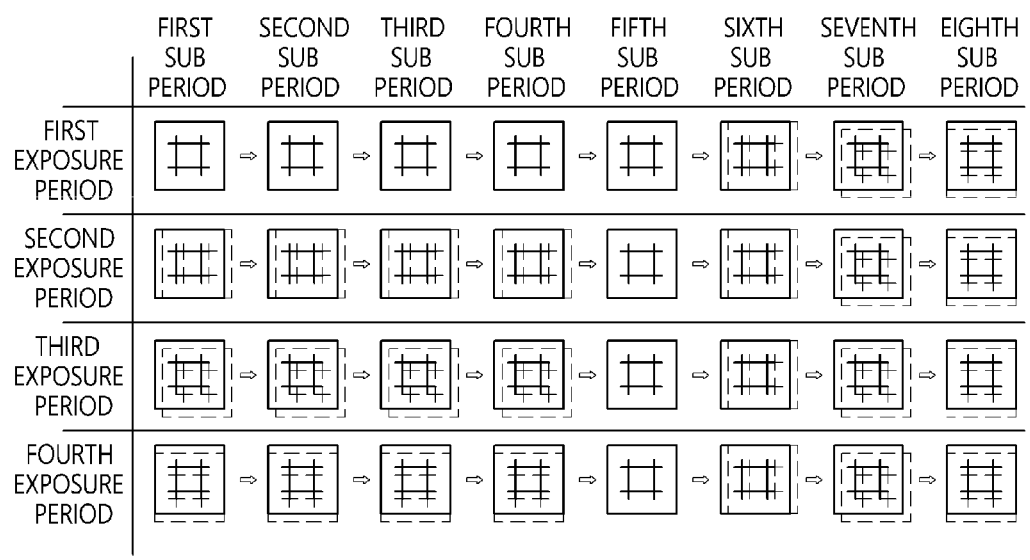

[FIG. 10]
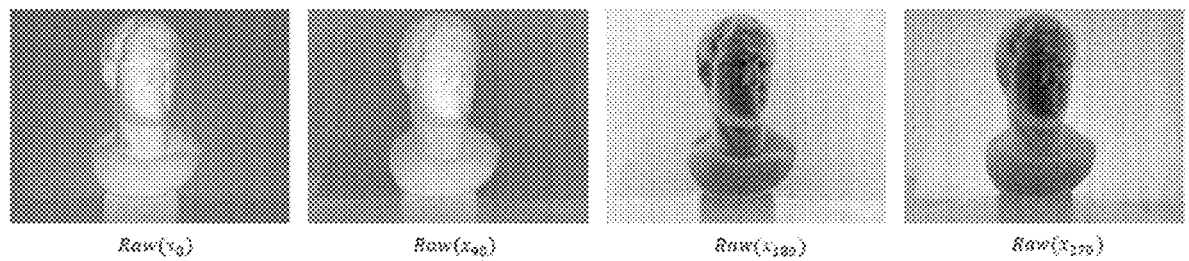
[FIG. 11]
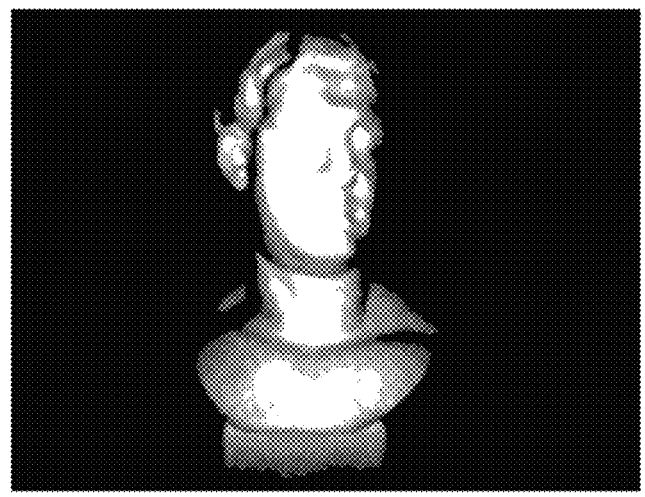
[FIG. 12]
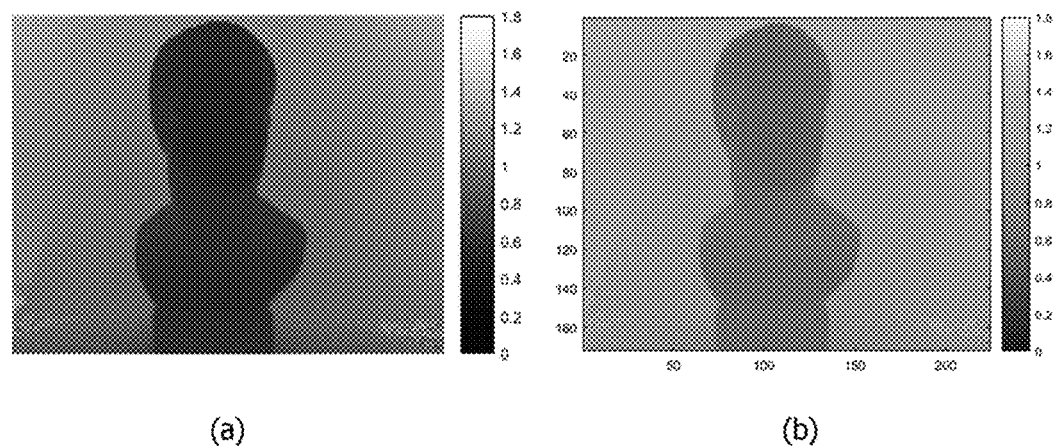
(a)                  (b)

[FIG. 13]
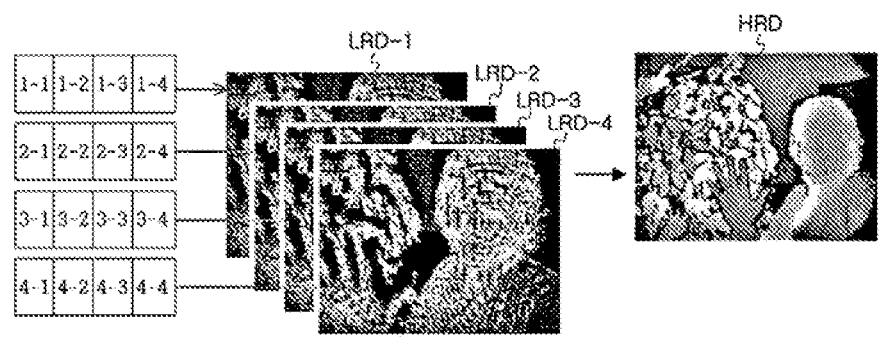

[FIG. 14]
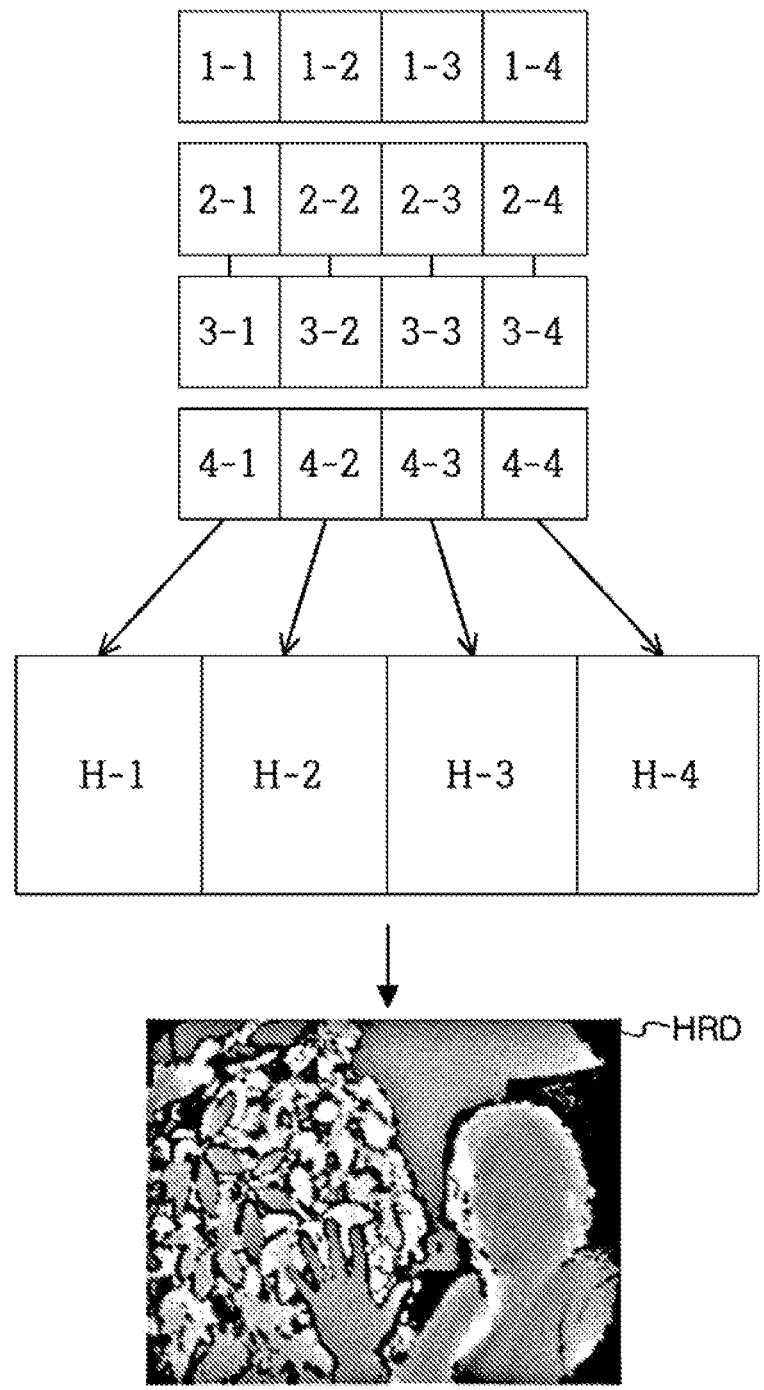

[FIG. 15]
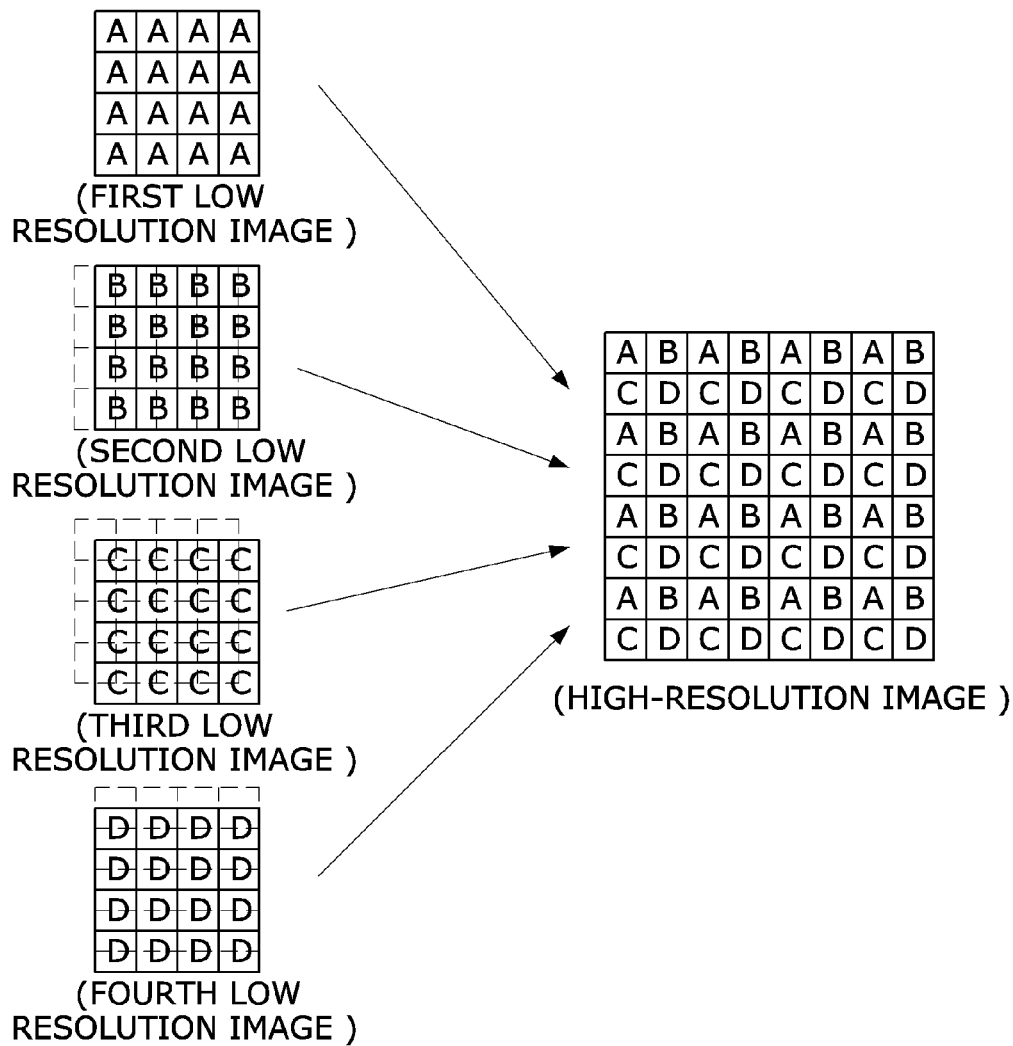

[FIG. 16]
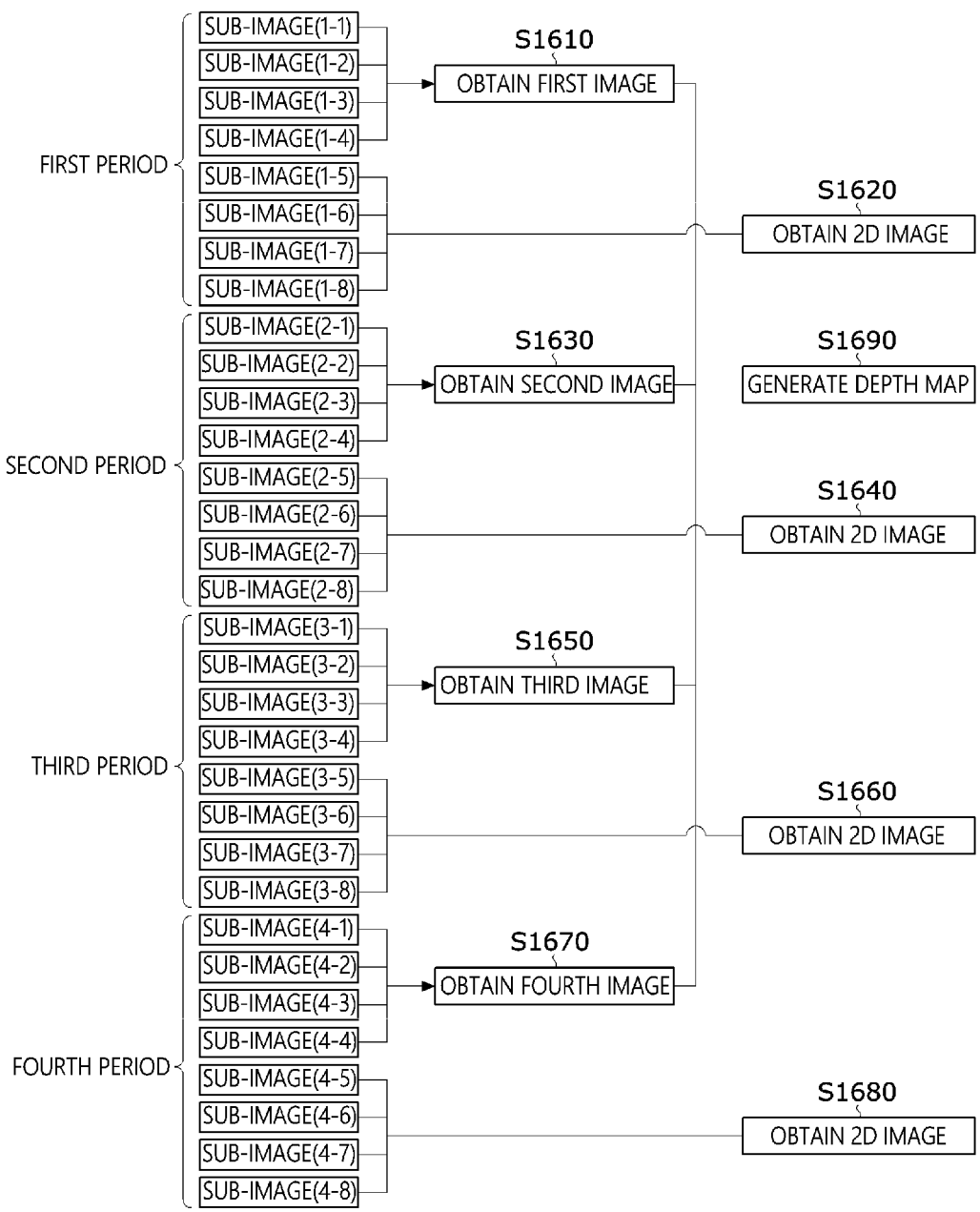

CAMERA MODULE

CROSS REFERENCE TO RELATED APPLICATIONS

This application is the National Phase of PCT International Application No. PCT/KR2019/012283, filed on Sep. 20, 2019, which claims priority under 35 U.S.C. 119(a) to Patent Application No. 10-2018-0114091, filed in the Republic of Korea on Sep. 21, 2018, all of which are hereby expressly incorporated by reference into the present application.

TECHNICAL FIELD

The present invention relates to a camera module.

BACKGROUND ART

Three-dimensional contents are applied to various fields such as education, manufacturing, automatic driving, and the like in addition to the fields of game and culture, and in order to obtain the three-dimensional contents, a depth map is required. The depth map is a map showing a spatial distance and shows perspective information of one point with respect to another point in a two-dimensional image.

One of the methods of obtaining a depth map is to project infrared (IR) structured light on an object and interpret reflected light from the object to extract a depth map. With the IR structured light, there is a problem in that it is difficult to obtain a desired level of depth resolution for a moving object.

Meanwhile, a time of flight (ToF) method is drawing attention as a technology replacing the IR structured light method. According to the ToF method, a flight time, that is, a time for which light is emitted, reflected, and returned, is measured to calculate a distance to an object. A big advantage of the ToF method is quickly providing information on a distance in a three-dimensional space in real time. In addition, a user may obtain accurate distance information without applying an additional algorithm or correcting hardware-wise. In addition, even when a very close subject or a moving subject is measured, an accurate depth map may be obtained.

However, in the case of the current ToF method, there is a problem in that information, which can be obtained from one frame, is insufficient, that is, the resolution thereof is very low. In addition, there is a problem in that a resolution of a two-dimensional (2D) image obtained using IR light is also low.

As a method of improving resolution, there is a method of increasing the number of pixels of an image sensor. However, in this case, there are problems in that a volume and manufacturing costs of a camera module are greatly increased.

Accordingly, a method of obtaining a depth map is required which allows resolution to be improved without greatly increasing the volume and manufacturing costs of the camera module.

Technical Problem

The present invention is directed to providing a camera module which extracts a depth map and generates a two-dimensional (2D) infrared image using a time of flight (ToF) method.

Technical Solution

One aspect of the present invention provides a camera module including a light output part configured to sequentially output a first output light signal and a second output light signal, which are emitted to an object, for one period, a lens part including an infrared (IR) filter and at least one lens disposed on the IR filter and configured to collect a first input light signal and a second input light signal reflected from the object, an image sensor configured to generate a first electrical signal and a second electrical signal from the first input light signal and the second input light signal which are collected by the lens part, a tilting part configured to shift an optical path of the first input light signal and an optical path of the second input light signal according to a predetermined rule, and an image control part configured to obtain a depth map of the object using a phase difference between the first output light signal and the first input light signal and the first electrical signal and configured to obtain a two-dimensional (2D) image of the object using the second electrical signal.

The image control part may obtain the depth map of the object using data extracted for a plurality of periods in which the optical path of the first input light signal is repeatedly shifted according to the predetermined rule.

The optical path of the first input light signal may be shifted based on a preset shift value in a first direction for a first period, shifted based on the preset shift value in a second direction perpendicular to the first direction for a second period, shifted based on the preset shift value in a third direction perpendicular to the second direction for a third period, and shifted based on the preset shift value in a fourth direction perpendicular to the third direction for a fourth period according to the predetermined rule.

The image control part may obtain the depth map of the object by matching a first image obtained from data extracted for the first period, a second image obtained from data extracted for the second period, a third image obtained from data extracted for the third period, and a fourth image obtained from data extracted for the fourth period by using the first electrical signal.

The image control part may obtain the 2D image using data extracted for one period in which the optical path of the second input light signal is repeatedly shifted according to the predetermined rule.

The optical path of the second input light signal may be shifted based on a preset shift value in a first direction for a first sub-period of the one period, shifted based on the preset shift value in a second direction perpendicular to the first direction for a second sub-period of the one period, shifted based on the preset shift value in a third direction perpendicular to the second direction for a third sub-period of the one period, and shifted based on the preset shift value in a fourth direction perpendicular to the third direction for a fourth period of the one period according to the predetermined rule.

The image control part may obtain the 2D image of the object by matching a first sub-image obtained from data extracted for the first sub-period, a second sub-image obtained from data extracted for the second sub-period, a third sub-image obtained from data extracted for the third sub-period, and a fourth sub-image obtained from data extracted for the fourth sub-period by using the second electrical signal.

The light output part may output the second output light signal in the form of a continuous wave.

The preset shift value may be greater than a value corresponding to zero pixels and smaller than a value corresponding to one pixel.

Advantageous Effects

According to embodiments of the present invention, both a depth image and a two-dimensional (2D) infrared image can be obtained using one camera module.

In addition, a depth map with high-resolution and a 2D infrared image can be obtained by shifting an optical path of an incident light signal even without greatly increasing the number of pixels of an image sensor.

DESCRIPTION OF DRAWINGS

FIG. 1 is a block diagram of a camera module according to one embodiment of the present invention.

FIG. 2 is a cross-sectional view illustrating one example of the camera module.

FIG. 3 is a view for describing an image sensor part according to the embodiment of the present invention.

FIG. 4 is a view for describing an output light signal of a light output part according to the embodiment of the present invention.

FIG. 5 is a view for describing a process in which the image sensor part according to the embodiment of the present invention generates a first electrical signal.

FIG. 6 is a set of views for describing a change in optical path of an input light signal by a tilting part.

FIGS. 7 and 8 are views for describing an effect in that an image frame input to the image sensor is shifted according to inclination control of an infrared (IR) filter.

FIG. 9 is a view for describing a predetermined rule by which an optical path of an input light signal is shifted by the tilting part according to the embodiment of the present invention.

FIG. 10 is a view showing examples of phase images obtained by the camera module according to one embodiment of the present invention, and FIG. 11 is a view showing an example of an amplitude image, and FIG. 12 is a set of views showing examples of depth images.

FIGS. 13 and 14 are views for describing a super resolution (SR) technique according to the embodiment of the present invention.

FIG. 15 is a view for describing a process of arranging pixel values according to the embodiment of the present invention.

FIG. 16 is a flowchart illustrating a method of generating a depth image and a two-dimensional (2D) image of a camera device according to one embodiment of the present invention.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

First, a structure of a camera module according to an embodiment of the present invention will be specifically described with reference to FIGS. 1 and 2. FIG. 1 is a block diagram of a camera module according to one embodiment of the present invention.

Referring to FIG. 1, a camera module 100 includes a light output part 110, a lens part 120, an image sensor part 130, a tilting part 140, and an image control part 150.

The light output part 110 generates a first output light signal and a second output light signal and emits the first output light signal and the second output light signal to an object. In this case, the first output light signal and the second output light signal may be sequentially output for one period and repeatedly output for a plurality of periods.

The light output part 110 may generate and output the output light signals in the form of pulse waves or continuous waves. The continuous waves may have the form of sinusoid waves or squared waves. Specifically, the light output part 110 may generate the first output light signal in the form of the pulse wave or the continuous wave and generate the second output light signal in the form of the continuous wave. According to the embodiment of the present invention, since the second output light signal is output in the form of the continuous wave, there is an advantage of decreasing a switching loss of the light output part 110.

In the present specification, output light may mean light which is output from the light output part 110 and is incident on the object, and input light may mean light which is output from the light output part 110, reaches the object, is reflected by the object, and is input to the camera module 100. From a viewpoint of the object, the output light may be incident light, and the input light may be reflected light.

The light output part 110 emits the generated first output light signal and second output light signal to the object for a predetermined exposure period. In this case, the exposure period means one frame period. In a case in which a plurality of frames are generated, a set exposure period is repeated. For example, the camera module 100 captures images of the object at 20 FPS, the exposure period is ¹⁄₂₀ [sec]. In addition, in a case in which 100 frames are generated, the exposure period may be repeated 100 times.

Referring to FIG. 1, in order to generate the first output light signal and the second output light signal, the light output part 110 may include a light source 112 configured to generate light and a light modulator 114 configured to modulate the light.

First, the light source 112 generates light. The light source 112 is repeatedly turned on and off at predetermined time intervals to generate the first output light signal and the second output light signal having the form of the pulse wave or the form of the continuous wave. The predetermined time interval may correspond to a frequency of the output light signal. Turning on and off of the light source may be controlled by the light modulator 114.

In this case, the light generated by the light source 112 may be infrared light with a wavelength of 770 to 3000 nm and may also be visible light with a wavelength of 380 to 770 nm. Light-emitting diodes (LEDs) may be used as the light source 112, and the light source 112 may have a form in which the plurality of LEDs are arranged in a predetermined pattern. In addition, the light source 112 may also include organic LEDs (OLEDs) or laser diodes (LDs). Alternatively, the light source 112 may also be a vertical cavity surface emitting laser (VCSEL). The VCSEL is one of the laser diodes configured to convert an electrical signal to a light signal and may use a wavelength of about 800 to 1000 nm, for example, about 850 nm or 940 nm.

In addition, the light modulator 114 controls turning on and off of the light source 112 to control the light source 112 to generate the first output light signal and the second output light signal in the form of the continuous wave or pulse wave. The light modulator 114 may control the light source 112 to generate the output light signal in the form of the continuous wave or pulse wave through frequency modulation, pulse modulation, or the like.

The lens part 120 collects a first input light signal and a second input light signal reflected from the object and transmits the first input light signal and the second input light signal to the image sensor part 130. The lens part 120 may include an infrared (IR) filter and one lens disposed on the IF filter to collect the first input light signal and the second input light signal.

The image sensor part 130 generates a first electrical signal and a second electrical signal using the first input light signal and the second input light signal collected through the lens part 120. In this case, the first electrical signal is a signal corresponding to the first input light signal, and the second electrical signal is a signal corresponding to the second input light signal.

Specifically, the image sensor part 130 may be synchronized with a turning on and off cycle of the light output part 110 to receive the first input light signal. The image sensor part 130 may receive first input light signals in phase and out of phase with the first output light signal output from the light output part 110. That is, the image sensor part 130 may repeatedly perform an operation of receiving the first input light signal at a time when the light source is turned on and an operation of receiving the first input light signal at a time when the light source is turned off.

In addition, the image sensor part 130 may receive the second input light signal to correspond to the second output light signal of the light output part 110. Specifically, the image sensor part 130 may be synchronized with a time at which the second output light signal is output to receive the second input light signal.

Then, the image sensor part 130 generates the first electrical signal and the second electrical signal using the received first input light signal and the received second input light signal, respectively. In this case, the first electrical signal may be generated using a plurality of reference signals having different phase differences.

The tilting part 140 shifts optical paths of the first input light signal and the second input light signal according to a predetermined rule.

Specifically, the tilting part 140 may shift the first input light signal by a preset shift value in a predetermined direction for each period. In addition, the tilting part 140 may shift the second input light signal by a preset shift value in a predetermined direction for each sub-period.

In this case, the tilting part 140 may shift the optical paths of the first input light signal and the second input light signal according to the preset shift values. In this case, the preset shift values may be set in units of sub-pixels of the image sensor part 130. The sub-pixel may be a unit greater than zero pixels and smaller than one pixel. In addition, the tilting part 140 may change a direction of at least one optical path of the output light signal or the input light signal to one direction of upward, downward, leftward, and rightward directions based on the present optical path.

The image control part 150 obtains a depth map and a two-dimensional (2D) image using the first electrical signal and the second electrical signal.

Referring to FIG. 1, the image control part 150 may include a first image acquisition part 151 configured to obtain a depth image and a second image acquisition part 152 configured to obtain a 2D image.

Specifically, the first image acquisition part 151 obtains a depth map of the object using a phase difference between the first output light signal and the first input light signal and the first electrical signal. The first image acquisition part 151 obtains the depth map of the object using data extracted for a plurality of periods in which the optical path of the first input light signal is repeatedly shifted according to the predetermined rule. In this case, the first image acquisition part 151 may obtain the depth map of the object by matching a first image obtained from data extracted for a first period, a second image obtained from data extracted for a second period, a third image obtained from data extracted for a third period, and a fourth image obtained from data extracted for a fourth period by using the first electrical signal.

In addition, the second image acquisition part 152 obtains the 2D image of the object using the second electrical signal. The second image acquisition part 152 may obtain a 2D image using data extracted for one period in which the optical path of the second input light signal is repeatedly shifted according to the predetermined rule. In this case, by using the second electrical signal, the second image acquisition part 152 may obtain the 2D image of the object by matching a first sub-image obtained from data extracted for a first sub-period, a second sub-image obtained from data extracted for a second sub-period, a third sub-image obtained from data extracted for a third sub-period, and a fourth sub-image obtained from data extracted for a fourth sub-period.

FIG. 2 is a cross-sectional view illustrating one example of the camera module.

Referring to FIG. 2, a camera module 300 includes a lens assembly 310, an image sensor 320, and a printed circuit board 330. In this case, the lens assembly 310 may correspond to the lens part 120 of FIG. 1, and the image sensor 320 may correspond to the image sensor part 130 of FIG. 1. In addition, the image control part 150 and the like of FIG. 1 may be formed on the printed circuit board 330. Although not illustrated in the drawing, the light output part 110 of FIG. 1 may be disposed beside the image sensor 320 on the printed circuit board 330 or disposed outside the camera module 300, for example, beside the camera module 300.

The lens assembly 310 may include a lens 312, a lens barrel 314, a lens holder 316, and an IR filter 318.

The lens 312 may be provided as a plurality of lenses 312 and may also be provided as one lens 312. In the case in which the lens 312 is provided as the plurality of lenses 312, the lenses may be aligned with respect to a central axis to form an optical system. In this case, the central axis may be the same as an optical axis of the optical system.

The lens barrel 314 may be coupled to the lens holder 316 and provided with a space for accommodating the lens therein. The lens barrel 314 may be rotatably coupled to one or the plurality of lenses, but this is merely exemplary, and the lens barrel 314 may be coupled thereto through a different method such as a method using an adhesive (for example, an adhesive resin such as an epoxy).

The lens holder 316 may be coupled to and support the lens barrel 314 and coupled to the printed circuit board 330 on which the image sensor 320 is mounted. Due to the lens holder 316, a space in which the IR filter 318 may be attached may be formed under the lens barrel 314. A spiral pattern may be formed on an inner circumferential surface of the lens holder 316, and the lens holder 316 may be rotatably coupled to the lens barrel 514 in which a spiral pattern is formed on an outer circumferential surface thereof as in the lens holder 316. However, this is merely exemplary, and the lens holder 316 and the lens barrel 314 may be coupled by an adhesive, or the lens holder 316 and the lens barrel 514 may also be integrally formed.

The lens holder 316 may be divided into an upper holder 316-1 coupled to the lens barrel 314 and a lower holder 316-2 coupled to the printed circuit board 330 on which the image sensor 320 is mounted, and the upper holder 316-1 and the lower holder 316-2 may be integrally formed, separately formed and fastened or coupled, or separately formed and spaced apart from each other. In this case, the upper holder 316-1 may be formed to have a diameter smaller than a diameter of the lower holder 316-2.

The above example is only one embodiment, and the lens part 120 may also be provided as a different structure which may collect the first input light signal and the second input light signal incident on the camera module 100 and transmit the collected first input light signal and the collected second input light signal to the image sensor part 130.

FIG. 3 is a view for describing the image sensor part according to the embodiment of the present invention.

The image sensor part 130 receives the first input light signal and the second input light signal to generate the first electrical signal and the second electrical signal, respectively.

To this end, the image sensor part 130 may be implemented as a complementary metal oxide semiconductor (CMOS) image sensor or charge coupled device (CCD) image sensor and may be formed in a structure in which a plurality of pixels are arranged in a grid shape. For example, in the case of the image sensor part 130 with a resolution of 320×240 as shown in FIG. 3, 76,800 pixels may be arranged in the grid shape.

Each pixel 132 may include a first light receiving part 132-1 including a first photodiode and a first transistor and a second light receiving part 132-2 including a second photodiode and a second transistor.

Constant gaps may be generated between the plurality of pixels like shaded regions of FIG. 3. In the embodiment of the present invention, one pixel with the constant gaps adjacent to one pixel will be described as one pixel.

Hereinafter, the components of the camera module according to the embodiment of the present invention will be described in detail with reference to FIGS. 4 to 15.

FIG. 4 is a view for describing the output light signal of the light output part according to the embodiment of the present invention.

As described above, the first output light signal and the second output light signal may be sequentially output for one period, that is, one exposure period. In addition, for a plurality of exposure periods, the first output light signal and the second output light signal may be repeatedly output. That is, the first output light signal and the second output light signal may be output in the same pattern.

In this case, as illustrated in FIG. 4, the first output light signal and the second output light signal may be generated to have different frequencies. According to the embodiment of the present invention, as illustrated in FIG. 4, the light output part 110 may be controlled to generate the first output light signal with a frequency f1 for a first half of the exposure period and generate the second output light signal with a frequency f2 for the remaining half of the exposure period. For example, the light output part 110 may generate the first output light signal with a frequency of 80.32 MHz and the second output light signal with a frequency of 60.24 MHz.

FIG. 5 is a view for describing a process in which the image sensor part according to the embodiment of the present invention generates the first electrical signal.

According to the embodiment of the present invention, in the image sensor part 130, a process of receiving the first input light signal and generating the first electrical signal may be different from a process of receiving the second input light signal and generating the second electrical signal.

First, the process of receiving the first input light signal and generating the first electrical signal will be described. The first light receiving part 132-1 receives the first input light signal with a phase which is the same as a phase of the first output light signal. That is, when the light source is turned on, the first photodiode is turned on and receives the first input light signal. In addition, when the light source is turned off, the first photodiode is turned off and stops receiving the first input light signal. The first photodiode converts the received first input light signal to a current and transmits the current to the first transistor. The first transistor converts the received current to an electrical signal and outputs the electrical signal.

The second light receiving part 132-2 receives the first input light signal with a phase opposite to a phase of a waveform of output light. That is, when the light source is turned on, the second photodiode is turned off and receives the first input light signal. In addition, when the light source is turned off, the second photodiode is turned on and stops receiving the first input light signal. The second photodiode converts the received first input light signal to a current and transmits the current to the second transistor. The second transistor converts the received current to an electrical signal.

Accordingly, the first light receiving part 132-1 may be referred to as an in-phase receiving unit, and the second light receiving part 132-2 may be referred to as an out-phase receiving unit. As described above, when the first light receiving part 132-1 and the second light receiving part 132-2 are activated at different times, a difference in amount of received light is generated according to a distance from the object. For example, in a case in which the object is directly in front of the camera module 100 (that is, a distance=0), since the time taken for light to be output from the light output part 110 and reflected by and returned from the object is zero, the turning on and off cycle of the light source is a light receiving cycle. Accordingly, only the first light receiving part 132-1 receives the light, and the second light receiving part 132-2 does not receive light. As another example, in a case in which the object is spaced apart from the camera module 100 by a predetermined distance, since it takes time for light to be output from the light output part 110 and reflected by and returned from the object, a turning on and off cycle of the light source is different from a light receiving cycle. Accordingly, a difference in amount of received light is generated between the first light receiving part 132-1 and the second light receiving part 132-2. That is, a distance from the object may be calculated using the difference in amount of received light between the first light receiving part 132-1 and the second light receiving part 132-2.

The image sensor part 130 may generate the first electrical signal corresponding to each of a plurality of reference signals having different phase differences using the reference signals and the electrical signals generated by the transistor of the first light receiving part 132-1 and the transistor of the second light receiving part 132-2. As illustrated in FIG. 5, when the first electrical signal corresponding to the first input light signal according to the embodiment of the present invention is generated, four reference signals $C_1$ to $C_4$ may be used. The reference signals $C_1$ to $C_4$ may have frequencies which are the same as a frequency of the output light signal and have phase differences of 90° between each other. One reference signal $C_1$ of the four reference signals may have a phase which is the same as a phase of the output light signal. A phase of the input light signal is delayed by a distance in which the output light signal is incident on the object and is reflected by and returned from the object. The image sensor part 130 mixes the input light signal and each of the corresponding reference signals. Then, the image sensor part 130 may generate the first electrical signal corresponding to each shaded region of the reference signals of FIG. 5.

In this case, the frequency of each of the reference signals may be set to be the same as the frequency of the first output light signal output from the light output part 110. In addition, the image sensor part 130 may convert the received second input light signal into electrical signals. Each of the electrical signals may include information about an amount of charge or voltage corresponding to the reference signals.

Next, the process of receiving the second input light signal and generating the first electrical signal will be described. The process of generating the second electrical signal may be different from the process of generating the first electrical signal. Since the second electrical signal is an electrical signal used to obtain the 2D image and not used to obtain the depth image, the reference signals may not be used, and the first light receiving part 132-1 and the second light receiving part 132-2 may receive the second input light signal at the same time. However, the first light receiving part 132-1 and the second light receiving part 132-2 may be synchronized with a tilting cycle of the tilting part 140 to receive light.

Next, the tilting part according to the embodiment of the present invention will be described in detail with reference to FIGS. 6 to 8.

FIG. 6 is a set of views for describing a change in optical path of an input light signal by the tilting part.

In FIG. 6A, a portion illustrated by a solid line shows a present optical path of the input light signal, and a portion illustrated by a dotted line shows a changed optical path thereof. When an exposure period corresponding to the present optical path is ended, the tilting part 140 may change the optical path of the input light signal to the optical path illustrated by the dotted line. Then, the path of the input light signal is moved by as much as a sub-pixel from the present optical path. For example, as illustrated in FIG. 6A, when the tilting part 140 moves the present optical path rightward by 0.173°, the input light signal incident on the image sensor part 130 may be moved rightward by as much as 0.5 pixels (sub-pixel).

According to the embodiment of the present invention, the tilting part 140 may change the optical path of the input light signal in the clockwise direction from a reference position. For example, as illustrated in FIG. 6B, after a first exposure period is ended, the tilting part 140 moves the optical path of the input light signal by as much as 0.5 pixels based on the image sensor part 130 in a second exposure period. In addition, the tilting part 140 moves the optical path of the input light signal downward by as much as 0.5 pixels based on the image sensor part 130 in a third exposure period. In addition, the tilting part 140 moves the optical path of the input light signal leftward by as much as 0.5 pixels based on the image sensor part 130 in a fourth exposure period. In addition, the tilting part 140 moves the optical path of the input light signal upward by as much as 0.5 pixels based on the image sensor part 130 in a fifth exposure period. That is, the tilting part 140 may move the optical path of the input light signal to an original position with four exposure periods.

Since this may be similarly applied when an optical path of an output light signal is moved, the detailed description thereof will be omitted. In addition, the change pattern of the optical path corresponding to the clockwise direction is only exemplary, and the change pattern may correspond to the counterclockwise direction.

Meanwhile, the subpixel may be greater than zero pixels and smaller than one pixel. For example, the subpixel may have a size of 0.5 pixels and also have a size of ⅓ pixels. A design of the subpixel may be changed by those skilled in the art.

FIGS. 7 and 8 are views for describing an effect in that an image frame input to the image sensor is shifted according to inclination control of the IR filter. FIG. 7 is a view illustrating a simulation result of a shift distance according to a tilting angle in a condition in which a thickness of the IR filter is 0.21 mm, and a refractive index of the IR filter is 1.5.

Referring to FIG. 7 and Equation 1 below, an inclination $\theta_i$ of the IR filter 318 and a shift distance may have a relationship below.

$$\Delta x = d\cos\theta_1 \left( \frac{1}{\tan(90° - \theta_1)} - \frac{1}{\tan(90° - \theta_2)} \right) \quad \text{[Equation 1]}$$

In this case, $\theta_2$ may be expressed as in Equation 2.

$$\theta_2 = \sin^{-1}\left(\frac{\sin\theta_1}{n_g}\right) \quad \text{[Equation 2]}$$

In addition, $\theta_i$ is an inclination of the IR filter 318, that is, a tilting angle, $n_g$ is a refractive index of the IR filter 318, and d is a thickness of the IR filter 318. For example, referring to Equations 1 and 2, in order to shift an image frame input to the image sensor by as much as 7 μm, the IR filter 318 may be tilted by as much as 5 to 6°. In this case, a vertical displacement of the IR filter 318 may be about 175 to 210 μm.

As described above, when the inclination of the IR filter 318 is controlled, shifted image data may be obtained even without tilting the image sensor 320.

According to the embodiment of the present invention, the tilting part 140 for tilting the inclination of the IR filter may include an actuator directly or indirectly connected to the IR filter, and the actuator may include at least one of micro-electro-mechanical systems (MEMS) device, a voice coil motor (VCM), and a piezoelectric element.

In this case, as described above, the sub-pixel is greater than zero pixels and smaller than one pixel, and very precise control is needed to shift an input light signal in this range. In a case in which the actuator is used to tilt the IR filter, the inclination of the tilted IR filter and a shift value of the input light signal may be different from preset values according to a precision degree of the actuator. Particularly, in a case in which an error or failure occurs during the operation of actuator, or an arrangement of components of the actuator becomes disjointed because the actuator is used for a long time, an error of the inclination of the IR filter and an error of the shift value of the input light signal may become very large. According to the embodiment of the present invention, the tilting part 140 may change an optical path of the input light signal in a software or hardware manner. The example in which the tilting part 140 shifts the optical path of the input light signal by controlling the inclination of the IR filter has been described above, but the present invention is not limited thereto.

FIG. 9 is a view for describing the predetermined rule by which an optical path of an input light signal is shifted by the tilting part according to the embodiment of the present invention.

In the embodiment of the present invention, the tilting part 140 may repeatedly shift the optical path of the first input light signal and the optical path of the second input light signal according to the predetermined rule.

As described above, since the light output part 110 sequentially outputs the first output light signal and the second output light signal for one period, the first input light signal and the second input light signal are also sequentially input to the lens part 120 for one period, that is, one exposure period.

For example, as illustrated in FIG. 9, when it is assumed that one exposure period includes eight sub-periods, the first input light signal may be input for first to fourth sub-periods, and the second input light signal may be input for fifth to eighth sub-periods.

The first input light signal may be shifted based on a preset shift value for a first period in a first direction, shifted based on the preset shift value for a second period in a second direction perpendicular to the first direction, shifted based on the preset shift value for the third period in a third direction perpendicular to the second direction, and shifted based on the preset shift value for a fourth period in a fourth direction perpendicular to the third direction by the tilting part 140 according to the predetermined rule.

Referring to FIG. 9, for example, the tilting part 140 may shift an optical path of a first input light signal in a first direction for a first period in units of sub-pixels, wherein the sub-pixel is greater than zero pixels and smaller than one pixel of the image sensor part 130, shift the optical path in a second direction perpendicular to the first direction for a second period in units of sub-pixels, shift the optical path in a third direction perpendicular to the second direction for a third period in units of sub-pixels, and shift the optical path in a fourth direction perpendicular to the third direction for a fourth period in units of sub-pixels, and the corresponding process may be repeatedly performed. In the present specification, the sub-pixel may mean a unit which is greater than zero pixels and smaller than one pixel. In the present specification, shifted distances for the first period in the first direction, the second period in the second direction, the third period in the third direction, and the fourth period in the fourth direction may be described with sub-pixel shift values or shift values. For example, in a case in which one pixel includes four (2*2) sub-pixels, and shifting is performed in units of sub-pixels, a shift value may be expressed as one sub-pixel, 0.5 pixels, or the like.

The optical path of a second input light signal may be shifted based on a preset shift value in a first direction for a first sub-period of one period, shifted based on the preset shift value for a second sub-period of one period in a second direction perpendicular to the first direction, shifted based on the preset shift value for a third sub-period of one period in a third direction perpendicular to the second direction, and shifted based on the preset shift value for a fourth period of one period in a fourth direction perpendicular to the third direction by the tilting part 140 according to the predetermined rule.

Referring to FIG. 9, for example, the tilting part 140 may shift an optical path of a first input light signal for a fifth sub-period of a first period in a first direction in units of sub-pixels, wherein the sub-pixel is greater than zero pixels and smaller than one pixel of the image sensor part 130, shift the optical path for a sixth sub-period of the first period in a second direction perpendicular to the first direction in units of sub-pixels, shift the optical path for a seventh sub-period of the first period in a third direction perpendicular to the second direction in units of sub-pixels, and shift the optical path for a eighth sub-pixel of the first period in a fourth direction perpendicular to the third direction in units of sub-pixels, and the corresponding process may be repeatedly performed for each exposure period. In the present specification, the sub-pixel may be a unit greater than zero pixels and smaller than one pixel. In the present specification, shifted distances for the first, second, third, and fourth periods in the first direction, second, third, and fourth directions may be expressed as sub-pixel shift values or shift values. For example, in a case in which one pixel includes four (2*2) sub-pixels and the optical path is shifted in units of one sub-pixels, the shift value may be expressed as one sub-pixel, 0.5 pixels, and the like. Hereinafter, obtaining a depth map and a 2D image performed by the image control part according to the embodiment of the present invention will be specifically described with reference to FIGS. 10 to 15.

As described above, the image control part 150 calculates a phase difference between a first output light signal and a first input light signal using a first electrical signal received from the image sensor part 130 and calculates a distance between the object and the camera module 100 using the phase difference.

Specifically, the image control part 150 may calculate the phase difference between the first output light signal and the first input light signal using information about an amount of charge of the first electrical signal.

As described above, four electrical signals may be generated for a frequency of the first output light signal. Accordingly, the image control part 150 may calculate a phase difference to between the first output light signal and the first input light signal using Equation 3 below.

$$t_d = \arctan\left(\frac{Q_3 - Q_4}{Q_1 - Q_2}\right) \quad \text{[Equation 3]}$$

Here, $Q_1$ to $Q_4$ are amounts of charges of four electrical signals. $Q_1$ is the amount of charge of the electrical signal corresponding to a reference signal with a phase which is the same as a phase of the first output light signal. $Q_2$ is the amount of charge of the electrical signal corresponding to a reference signal with a phase delayed by 180° from the phase of the first output light signal. $Q_3$ is the amount of charge of the electrical signal corresponding to a reference signal with a phase delayed by 90° from the phase of the first output light signal. $Q_4$ is the amount of charge of the electrical signal corresponding to a reference signal with a phase delayed by 270° from the phase of the first output light signal.

Then, image control part 150 may calculate a distance between the object and the camera module 100 using the phase difference between the first output light signal and the first input light signal. In this case, the image control part 150 may calculate a distance d between the object and the camera module 100 using Equation 4 below.

$$d = \frac{c}{2f}\frac{t_d}{2\pi} \quad \text{[Equation 4]}$$

Here, c is the speed of light, and f is a frequency of the first output light.

According to the embodiment of the present invention, a time of flight (ToF) IR image and a depth image may be obtained from the camera module 100.

More specifically, as illustrated in FIG. 10, raw images according to four phases may be obtained from the camera module 100 according to the embodiment of the present invention. In this case, the four phases may be 0°, 90°, 180°, and 270°, and the raw image for each of the phases may be an image including pixel values digitized for each of the phases and may also be referred to as a phase image, a phase IR image, or the like.

When calculation is performed using the four phase images of FIG. 10 and Equation 5, an amplitude image which is a ToF IR image of FIG. 5 may be obtained.

$$\text{Amplitude} = \frac{1}{2}\sqrt{(\text{Raw}(x_{90}) - \text{Raw}(x_{270}))^2 + (\text{Raw}(x_{180}) - \text{Raw}(x_0))^2} \quad \text{[Equation 5]}$$

Here, $\text{Raw}(x_0)$ may be a data value for each pixel received by the sensor at the phase 0°, $\text{Raw}(x_{90})$ may be a data value for each pixel received by the sensor at the phase 90°, $\text{Raw}(x_{180})$ may be a data value for each pixel received by the sensor at the phase 180°, and $\text{Raw}(x_{270})$ may be data value for each pixel received by the sensor at the phase 270°.

Alternatively, when calculation is performed using the four phase images of FIG. 10 and Equation 6, an intensity image which is another ToF IR image may also be obtained.

$$\text{Intensity} = |\text{Raw}(x_{90}) - \text{Raw}(x_{270})| + |\text{Raw}(x_{180}) - \text{Raw}(x_0)| \quad \text{[Equation 6]}$$

In this case, $\text{Raw}(x_0)$ may be a data value for each pixel received by the sensor at the phase 0°, $\text{Raw}(x_{90})$ may be a data value for each pixel received by the sensor at the phase 90°, $\text{Raw}(x_{180})$ may be a data value for each pixel received by the sensor at the phase 180°, and $\text{Raw}(x_{270})$ may be a data value for each pixel received by the sensor at the phase 270°.

As described above, the ToF IR image is an image generated through an operation of subtracting two phase images among four phase images from the remaining two phase images, and background light may be removed through the operation. Accordingly, in the ToF IR image, only a signal with a wavelength output by the light source remains so that IR sensitivity for the object can be increased and noise can be significantly reduced.

In the present specification, the ToF IR image may mean the amplitude image or intensity image, and the intensity image may also be referred to as a confidence image. As illustrated in FIG. 7, the ToF IR image may be a grey image.

Meanwhile, when calculation is performed using four phase images of FIG. 10 and Equations 7 and 8, a depth image of FIG. 11 may be obtained.

$$\text{Phase} = \arctan\left(\frac{\text{Raw}(x_{90}) - \text{Raw}(x_{270})}{\text{Raw}(x_{180}) - \text{Raw}(x_0)}\right) \quad \text{[Equation 7]}$$

$$\text{Depth} = \frac{1}{2f}c\frac{\text{Phase}}{2\pi} \quad (c = \text{speed of light}) \quad \text{[Equation 8]}$$

In addition, the image control part 150 may obtain a 2D image of the object using a second electrical signal received from the image sensor part 130.

As described above, since the tilting part 140 tilts a second input light signal for each sub-period of one period, and the image sensor part 130 is synchronized with the tilting part 140 and generates the second electrical signal, the second electrical signal corresponding to the second input light signal may include a plurality of signals. For example, when the second input light signal is input for four sub-periods, the second electrical signal may include four electrical signals.

The image control part 150 may generate a plurality of sub-frames using the electrical signals generated for the sub-periods. For example, in a case in which the second electrical signal includes four electrical signals corresponding to four sub-periods, the image control part 150 may generate four sub-frames.

The depth map generated for one period or the plurality of sub-frames generated for one period may be used as a depth image or a 2D image. However, in a case in which the resolution of the image sensor part 130 is low, there is a problem in that the resolution of the depth image or the 2D image is lowered. Accordingly, the image control part 150 according to the embodiment of the present invention generates one high-resolution depth image and one high-resolution 2D image by matching a plurality of low-resolution depth images and a plurality of low-resolution 2D images, respectively.

Specifically, the image control part obtains a depth map of the object using data extracted for a plurality of periods in which an optical path of a first input light signal is repeatedly shifted according to the predetermined rule. The image control part obtains the depth map of the object by matching a first image obtained from data extracted for a first period, a second image obtained from data extracted for a second period, a third image obtained from data extracted for a third period, and a fourth image obtained from data extracted for a fourth period by using a first electrical signal.

In addition, the image control part obtains a 2D image using data extracted for one period in which an optical path of a second input light signal is repeatedly shifted according to the predetermined rule. The image control part may obtain the 2D image of the object by matching a first sub-image obtained from data extracted for a first sub-period, a second sub-image obtained from data extracted for a second sub-period, a third sub-image obtained from data extracted for a third sub-period, and a fourth sub-image obtained from data extracted for a fourth sub-period by using a second electrical signal.

In the embodiment of the present invention, a super resolution (SR) technique is used in order to increase the resolution of the depth image and the resolution of the 2D image. The SR technique is a technique for obtaining a high-resolution image from a plurality of low-resolution images, and a mathematical model of the SR technique may be expressed as Equation 9.

$$y_k = D_k B_k M_k x + n_k \quad \text{[Equation 9]}$$

Here, $1=k \leq p$, p is the number of low resolution images, $y_k$ is a low resolution image $(=[y_{k,1}, \text{ and } y_{k,2} \text{ to } y_{k,M}]^T$, here, $M=N_1*N_2$), $D_k$ is a down sampling matrix, $B_k$ is an optical blur matrix, $M_k$ is an image warping matrix, x is a high-resolution image $(=[x_1, \text{ and } x_2 \text{ to } x_N]^T$, here, $N=L_1N_1*L_2N_2$), and $n_k$ is noise. That is, according to the SR technique, an inverse function of estimated resolution degradation factors is applied to $y_k$ to estimate x. The SR technique may be mainly divided into a statistical method and a multi-frame method, and the multi-frame method may be mainly divided into a space division method and a time division method. However, in a case in which the SR technique is used to obtain a depth map, since an inverse function of $M_k$ of Equation 9 is not present, the statistical method may be tried. However, in the case of the statistical method, since repeated calculation is required, there is a problem of low efficiency.

To this end, in the present invention, since the tilting part 140 changes an optical path of a first input light signal and an optical path of a second input light signal by a shift value preset according to the predetermined rule to obtain a low-resolution image map in order to solve this problem, the inverse function of Mk of Equation 9 may be accurately calculated even without using the statistical method.

FIGS. 13 and 14 are views for describing the SR technique according to the embodiment of the present invention.

In FIGS. 13 and 14, a process in which a high-resolution depth map is obtained using a low-resolution depth map is illustrated.

Referring to FIG. 13, the image control part 150 may extract a plurality of low-resolution depth maps using a plurality of low-resolution sub-frames generated in one exposure period, that is, one frame. In addition, the image control part 150 may extract a high-resolution depth map by rearranging pixel values of the plurality of low-resolution depth maps. In this case, optical paths, which correspond to the plurality low-resolution depth maps, of a first input light signal may be different from each other.

For example, the image control part 150 may generate low-resolution sub-frames 1-1 to 4-4 using a plurality of electrical signals included in a first electrical signal. The low-resolution sub-frames 1-1 to 1-4 are low-resolution sub-frames generated for a first exposure period. The low-resolution sub-frames 2-1 to 2-4 are low-resolution sub-frames generated for a second exposure period. The low-resolution sub-frames 3-1 to 3-4 are low-resolution sub-frames generated for a third exposure period. The low-resolution sub-frames 4-1 to 4-4 are low-resolution sub-frames generated for a fourth exposure period. Then, the image control part 150 applies a depth map extraction technique to the plurality of low-resolution sub-frames generated for the exposure periods to extract low-resolution depth maps LRD-1 to LRD-4. The low-resolution depth map LRD-1 is a low-resolution depth map extracted using the sub-frames 1-1 to 1-4. The low-resolution depth map LRD-2 is a low-resolution depth map extracted using the sub-frames 2-1 to 2-4. The low-resolution depth map LRD-3 is a low-resolution depth map extracted using the sub-frames 3-1 to 3-4. The low-resolution depth map LRD-4 is a low-resolution depth map extracted using the sub-frames 4-1 to 4-4. In addition, the image control part 150 extract a high-resolution depth map HRD by rearranging pixel values of the low-resolution depth maps LRD-1 to LRD-4.

As another example, referring to FIG. 14, the image control part 150 may generate a high-resolution sub-frame by rearranging pixel values of a plurality of sub-frames corresponding to one reference signal. In this case, optical paths, which correspond to the plurality of sub-frames, of a first input light signal are different. In addition, the image control part 150 may extract a high-resolution depth map using a plurality of high-resolution sub-frames.

For example, in FIG. 14, the image control part 150 generates low-resolution sub-frames 1-1 to 4-4 using a plurality of electrical signals included in a first electrical signal. The low-resolution sub-frames 1-1 to 1-4 are low-resolution sub-frames generated in a first exposure period. The low-resolution sub-frames 2-1 to 2-4 are low-resolution sub-frames generated in a second exposure period. The low-resolution sub-frames 3-1 to 3-4 are low-resolution sub-frames generated in a third exposure period. The low-resolution sub-frames 4-1 to 4-4 are low-resolution sub-frames generated in a fourth exposure period. In this case, the low-resolution sub-frames 1-1, 2-1, 3-1, and 4-1 correspond to one reference signal $C_1$ and correspond to different optical paths. Then, the image control part 150 may generate a high-resolution sub-frame H-1 by rearranging pixel values of the low-resolution sub-frames 1-1, 2-1, 3-1, and 4-1. When the high-resolution sub-frames H-1 to H-4 are generated by rearranging the pixel values, the image control part applies a depth map extraction technique to the high-resolution sub-frames H-1 to H-4 to extract a high-resolution depth map HRD.

Meanwhile, the image control part 150 may obtain one high-resolution 2D image using a plurality of low-resolution sub-frames generated in one exposure period, that is, one frame. For example, the image control part 150 may generate a plurality of low-resolution sub-frames, that is, sub-images, using a plurality of electrical signals included in a second electrical signal and obtain one high-resolution 2D image by matching the sub-images.

As described above, in the case of a depth image, since one depth map is obtained by matching depth maps generated for a plurality of periods, the number of depth maps may be small when compared to an image capturing speed of the camera module 100. For example, in a case in which one depth map is obtained by matching depth maps for four periods, a camera module with 100 fps may obtain 25 high-resolution depth maps per second.

On the other hand, in the case of a 2D image, since one high-resolution 2D image is obtained by matching a plurality of sub-images generated in one period, the number of obtained 2D images may match the image capturing speed of the camera module 100. For example, the camera module with 100 fps may obtain 100 high-resolution 2D images per second.

FIG. 15 is a view for describing a process of arranging pixel values according to the embodiment of the present invention.

In this case, it is assumed that one high-resolution image having a size of 8×8 is generated using four low-resolution images each having a size of 4×4. In this case, a high-resolution pixel grid has 8×8 pixels of which the number is the same as the number of pixels of the high-resolution image. In this case, the low-resolution image may refer to including a low-resolution sub-frame and a low-resolution depth map, and the high-resolution image may refer to including a high-resolution sub-frame and a high-resolution depth map.

In FIG. 15, first to four low-resolution images are images captured when optical paths are shifted in units of sub-pixels, wherein the sub-pixel is 0.5 pixels. The image control part 150 arranges pixel values of the second to fourth low-resolution images to match a high-resolution image according to directions in which optical paths are shifted based on the first low-resolution image of which an optical path is not shifted.

Specifically, the second low-resolution image is an image shifted rightward from the first low-resolution image by as much as the sub-pixel. Accordingly, pixels B of the second low-resolution images are disposed at pixels positioned at right sides of pixels A of the first low-resolution image.

The third low-resolution image is an image shifted downward from the second low-resolution image by as much as the sub-pixel. Accordingly, pixels C of the third low-resolution image are disposed at pixels positioned below the pixels B of the second low-resolution image.

The fourth low-resolution image is an image shifted leftward from the third low-resolution image by as much as the sub-pixel. Accordingly, pixels D of the fourth low-resolution image are disposed at pixels positioned at left sides of the pixels C of the third low-resolution image.

When the pixel values of the first to fourth low-resolution images are rearranged in a high-resolution pixel grid, a high-resolution image frame of which a resolution is increased by four times a resolution of each of the low-resolution images is generated.

Meanwhile, the image control part 150 may apply weights to the pixel values to be arranged. In this case, the weights may be set to be different according to sizes of the sub-pixels or shifting directions of the optical paths, and the weights of the low-resolution images may be set to be different.

According to one embodiment, a tilting part 140 may shift an input light signal through a method of controlling an inclination of a lens assembly, for example, an IR filter 318 (see FIG. 2) included in the lens assembly so that data shifted by as much as a sub-pixel may be obtained.

FIG. 16 is a flowchart illustrating a method of generating a depth image and a two-dimensional (2D) image of a camera device according to one embodiment of the present invention.

Referring to FIG. 16, the image control part 150 of the camera device 100 according to the embodiment of the present invention may obtain eight sub-images for each period. Among eight sub-images, four sub-images may be used to generate a depth map, and the remaining four sub-images may be used to generate a 2D image. First, the image control part 150 obtains a first image using sub-images 1-1 to 1-4 obtained for a first period (S1610). In addition, the image control part 150 obtains a 2D image generated for the first period by matching sub-images 1-5 to 1-8 obtained for the first period (S1620).

Next, the image control part 150 obtains a second image using sub-images 2-1 to 2-4 obtained for a second period (S1630). In addition, the image control part 150 obtains a 2D image generated for the second period by matching sub-images 2-5 to 2-8 obtained for the second period (S1640).

Next, the image control part 150 obtains a third image using sub-images 3-1 to 3-4 obtained for a third period (S1650). In addition, the image control part 150 obtains a 2D image generated for the third period by matching sub-images 3-5 to 3-8 obtained for the third period (S1660).

Next, the image control part 150 obtains a fourth image using sub-images 4-1 to 4-4 obtained for a fourth period (S1670). In addition, the image control part 150 obtains a 2D image generated for the fourth period by matching sub-images 4-5 to 4-8 obtained for the fourth period (S1680).

In addition, the image control part 150 generates one depth map by matching the first image, the second image, the third image, and fourth image. To this end, the first image, the second image, the third image, and the fourth image may be matched into one depth map or one depth image using the SR technique as described above.

As described above, the first image may be an image obtained from data extracted for the first period in which an optical path of a first input light signal is shifted based on a preset shift value in a first direction, the second image may be an image obtained from data extracted for the second period in which the optical path of the first input light signal is shifted in a second direction perpendicular to the first direction based on the preset shift value, the third image may be an image obtained from data extracted for the third period in which the optical path of the first input light signal is shifted in a third direction perpendicular to the second direction based on the preset shift value, and the fourth image may be an image obtained from data extracted for the fourth period in which the optical path of the first input light signal is shifted in a fourth direction perpendicular to the third direction based on the preset shift value In addition, among the sub-images, the sub-images 1-5, 2-5, 3-5, and 4-5 used to generate the 2D images of the periods may be images obtained from data extracted for the first period in which an optical path of a second input light signal is shifted based on the preset shift value in the first direction, the sub-images 1-5, 2-5, 3-5, and 4-5 may be images obtained from data extracted for the second period in which the optical path of the second input light signal is shifted based on the preset shift value in the second direction perpendicular to the first direction, the sub-images 1-5, 2-5, 3-5, and 4-5 may be images obtained from data extracted for the third period in which the optical path of the second input light signal is shifted based on the preset shift value in the third direction perpendicular to the second direction, the sub-images 1-5, 2-5, 3-5, and 4-5 may be images obtained from data extracted for the fourth period in which the optical path of the second input light signal is shifted based on the preset shift value in the fourth direction perpendicular to the third direction.

While the present invention has been mainly described above with reference to the embodiments, it will be understood by those skilled in the art that the present invention is not limited to the embodiments, the embodiments are only exemplary, and various modifications and applications which are not illustrated above may fall within the range of the present invention without departing from the essential features of the present embodiments. For example, components specifically described in the embodiments may be modified and implemented. In addition, it should be interpreted that differences related to modifications and applications fall within the scope of the present invention defined by the appended claims.

The invention claimed is:

1. A camera device comprising:
a light output part configured to sequentially output a first output light signal and a second output light signal, which are emitted to an object, for one period;
a lens part including an infrared (IR) filter and at least one lens disposed on the IR filter and configured to collect a first input light signal and a second input light signal reflected from the object;
an image sensor configured to generate a first electrical signal and a second electrical signal from the first input light signal and the second input light signal which are collected by the lens part;
a tilting part configured to shift an optical path of the first input light signal and an optical path of the second input light signal according to a predetermined rule; and
an image control part configured to obtain a depth map of the object using the first electrical signal and a phase difference between the first output light signal and the first input light signal, and configured to obtain a two-dimensional (2D) image of the object using the second electrical signal,
wherein the tilting part shifts the optical path when an exposure cycle corresponding to a current optical path ends, and changes the optical path of the first input light signal and the second input light signal clockwise from a reference position.

2. The camera device of claim 1, wherein the one period comprises a plurality of sub-periods, wherein the plurality of sub-period comprise sub-periods corresponding to the first input light signal and sub-periods corresponding to the second input light signal.

3. The camera device of claim 2, wherein the tilting part does not shift the optical path of the first input light signal within the plurality of sub-periods corresponding to the first input light signal included in the same sub-periods, shifts the optical path of the second input light signal within the plurality of sub-periods corresponding to the second input light signal included in the same sub-periods.

4. The camera device of claim 1, wherein the image control part obtains the depth map of the object using data extracted for a plurality of periods in which the optical path of the first input light signal is repeatedly shifted according to the predetermined rule.

5. The camera device of claim 4, wherein the optical path of the first input light signal is shifted based on a preset shift value in a first direction for a first period, shifted based on the preset shift value in a second direction perpendicular to the first direction for a second period, shifted based on the preset shift value in a third direction perpendicular to the second direction for during a third period, and shifted based on the preset shift value in a fourth direction perpendicular to the third direction for a fourth period according to the predetermined rule.

6. The camera device of claim 5, wherein the image control part obtains the depth map of the object by matching a first image obtained from data extracted for the first period, a second image obtained from data extracted for the second period, a third image obtained from data extracted for the third period, and a fourth image obtained from data extracted for the fourth period by using the first electrical signal.

7. The camera device of claim 5, wherein the image control part obtains the depth map of the object by rearranging pixel values of the first to fourth images in correspondence with the direction of movement of the optical path of the first input optical signal.

8. The camera device of claim 7, wherein the image control part obtains the depth map of the object by applying weights to pixel values of the first to fourth images, wherein the weights are set based on at least one of the preset shift value and the direction of movement of the optical path of the first input optical signal.

9. The camera device of claim 5, wherein the image control part obtains the depth map of the object from the first image to the fourth image based on a super-resolution technique using a down sampling matrix, an optical blur matrix and an image warping matrix.

10. The camera device of claim 5, wherein the image control part obtains the depth of the object by applying the super-resolution technique to the first image to the fourth image using an inverse function of the image warping matrix calculated based on the preset shift value.

11. The camera device of claim 5, wherein the preset shift value is greater than a value corresponding to zero pixels and smaller than a value corresponding to one pixel.

12. The camera device of claim 1, wherein the image control part obtains the 2D image using data extracted for one period in which the optical path of the second input light signal is repeatedly shifted according to the predetermined rule.

13. The camera device of claim 12, wherein the optical path of the second input light signal is shifted based on a preset shift value in a first direction for a first sub-period of the one period, shifted based on the preset shift value in a second direction perpendicular to the first direction for a second sub-period of the one period, shifted based on the preset shift value in a third direction perpendicular to the second direction for a third sub-period of the one period, and shifted based on the preset shift value in a fourth direction perpendicular to the third direction for a fourth period of the one period according to the predetermined rule.

14. The camera device of claim 13, wherein the image control part obtains the 2D image of the object by matching a first sub-image obtained from data extracted for the first sub-period, a second sub-image obtained from data extracted for the second sub-period, a third sub-image obtained from data extracted for the third sub-period, and a fourth sub-image obtained from data extracted for the fourth sub-period by using the second electrical signal.

15. The camera device of claim 14, wherein the tilting part shifts the optical paths of the first input optical signal and the optical paths of the second input optical signal by tilting the IR filter.

16. The camera device of claim 1, wherein the light output part outputs the second output light signal in a form of a continuous wave.

* * * * *